United States Patent [19]
Blakey

[11] 3,817,583
[45] June 18, 1974

[54] HYDRAULIC BRAKING SYSTEMS FOR VEHICLES

[75] Inventor: Roy Blakey, Solihull, England

[73] Assignee: Girling Limited, Birmingham, England

[22] Filed: Mar. 15, 1972

[21] Appl. No.: 234,709

[30] Foreign Application Priority Data
Mar. 23, 1971  Great Britain...................... 7761/71
June 19, 1971  Great Britain.................... 28844/71

[52] U.S. Cl............................................. 303/6 R
[51] Int. Cl............................................ B60t 13/00
[58] Field of Search............. 303/6 A, 6 R; 188/345

[56] References Cited
UNITED STATES PATENTS
2,747,372  5/1956  York................................ 188/345 X
3,447,835  6/1969  Parkhurst....................... 188/345 X
3,504,948  4/1970  Inada............................... 303/6 R FOREIGN PATENTS OR APPLICATIONS
599,937  6/1960  Canada.............................. 188/345
1,228,953  11/1966  Germany........................... 188/345

*Primary Examiner*—Richard A. Schacher
*Attorney, Agent, or Firm*—Scrivener, Parker, Scrivener & Clarke

[57] ABSTRACT

In an hydraulic braking system for a vehicle incorporating brakes on a front pair of wheels and at least one pair of rear wheels on opposite sides of the vehicle, a total of at least three pressure spaces is defined within at least one master cylinder, and at least one brake on each wheel of each pair of wheels is adapted to be actuated by at least one hydraulic actuator. Each pressure space is adapted to supply fluid under pressure to at least one pair of hydraulic actuators for applying a pair of brakes of which the brakes of that pair are each located on a different wheel of a pair of wheels on opposite sides of the vehicle.

8 Claims, 5 Drawing Figures

HYDRAULIC BRAKING SYSTEMS FOR VEHICLES

This invention relates to hydraulic braking systems for vehicles of the kind in which hydraulic actuators of brakes on a front pair of wheels, and on at least one rear pair of wheels on opposite sides of the vehicle are supplied with hydraulic fluid under pressure from at least one master cylinder adapted to be operated, either directly or indirectly, by a pedal.

It is desirable, and in some countries a legal requirement, that a predetermined minimum retardation of a commercial vehicle is achieved when a predetermined minimum effort is applied to a pedal for operating at least one master cylinder, either directly or indirectly, and that braking of an uneven number of wheels of the vehicle can not occur upon failure of at least a part of the system.

According to our invention in an hydraulic braking system of the kind set forth a total of at least three pressure spaces is defined within at least one master cylinder, and at least one brake on each wheel of each pair of wheels of the vehicle is adapted to be actuated by at least one hydraulic actuator, each pressure space being adapted to supply fluid under pressure to at least one pair of hydraulic actuators for applying a pair of brakes of which the brakes of that pair are each located on a different wheel of a pair of wheels on opposite sides of the vehicle.

When one of the pressure spaces or one of the circuits between that pressure space and a pair of hydraulic actuators fails, only the brakes on one pair of wheels are affected, and the brakes on the remaining even number of wheels can still be applied.

Thus braking of an uneven number of wheels can never take place and, upon failure of one of the pressure spaces or one of the circuit between that pressure space and a pair of hydraulic actuators, actuation of the brakes on the remaining even number of wheels in response to a predetermined minimum pedal effort is sufficient to subject the vehicle to the predetermined minimum retardation.

Each hydraulic actuator may comprise a wheel cylinder for actuating an internal shoe-drum brake or an hydraulic actuator of a disc brake.

Where each front wheel is adapted to be braked by an internal shoe-drum brake preferably the brake on each front wheel of the vehicle is adapted to be actuated by a pair of wheel cylinders, one pressure space being connected to one wheel cylinder of each brake, and another pressure space being connected to the other wheel cylinder of each brake.

Alternatively the wheel cylinders of the front wheel brakes are connected to a common pressure space.

In another arrangement in which each front wheel is adapted to be braked by a pair of disc brakes, preferably one pressure space is connected to one disc brake on each wheel, and another pressure space is connected to the other disc wheel of each brake.

The three pressure spaces may be provided in a single master cylinder of the triple type, or may be defined by three separate master cylinders each having a single pressure space, or by a tandem master cylinder having two pressure spaces in combination with a single master cylinder having a single pressure space. Where the pressure spaces are defined within more than one master cylinder the actuating rods are actuated either directly or indirectly from a single common pedal through at least one balance beam or other compensating bar.

Some embodiments of our invention are illustrated in the accompanying drawings in which.

Figure 1:
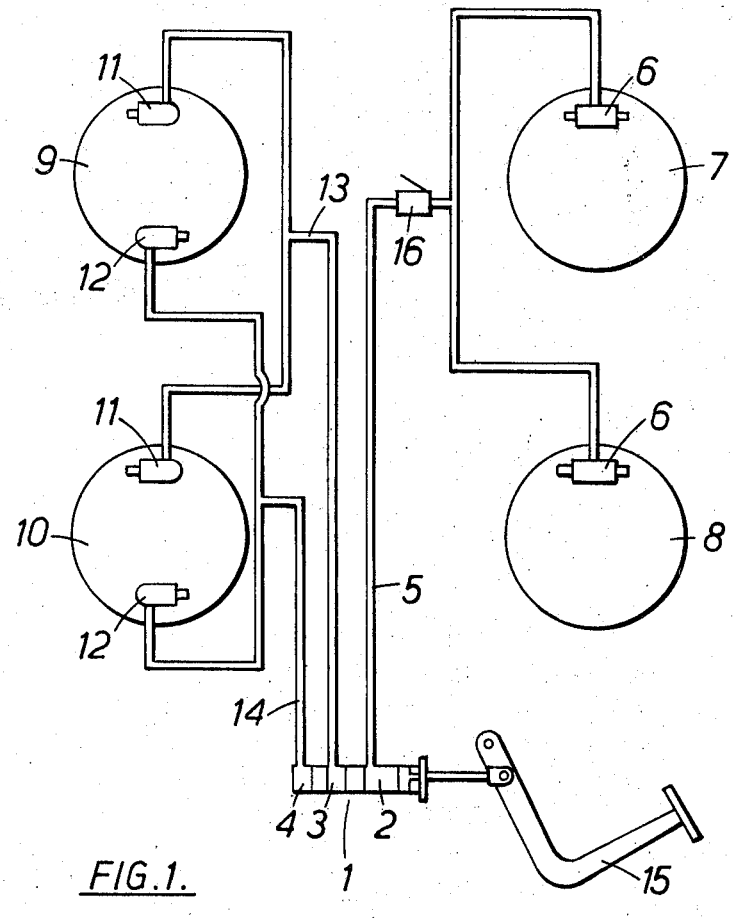
FIG. 1 is a layout of an hydraulic braking system for a commercial vehicle incorporating a triple master cylinder.

In the braking system illustrated in the layout of FIG. 1 of the drawings a pedal-operated master cylinder of the triple type 1 is provided with first, second and third pressure spaces 2, 3 and 4 defined within a cylinder bore between a positively actuated piston and a first floating piston, between the first floating piston and a second floating piston, and between the second floating piston and a closed inner end of the bore respectively.

The first pressure space 2 is connected through a pipeline 5 to a pair of hydraulic wheel cylinders 6, for actuating simultaneously the brakes on a pair of rear wheels 7 and 8 of the vehicle.

Each front wheel 9 and 10 is provided with a brake adapted to be actuated by one or both of a pair of independently operable wheel cylinders 11 and 12. Both wheel cylinders 11 are connected to the pressure space 3, through a pipe-line 13, and both wheel cylinders 12 are connected to the pressure space 4, through a pipe-line 14.

When the master cylinder 1 is operated by operation of a pedal 15, fluid under pressure is applied to the wheel cylinders 6 through the pipeline 5 to actuate the brakes on the rear wheels 7 and 8 of the vehicle. Fluid under pressure is also supplied to the wheel cylinders 11 and 12 of both front wheel brakes so that the front wheel brakes and the rear wheel brakes are applied simultaneously.

Under these conditions, the effort to be applied to the pedal of the master cylinder to subject the vehicle to a predetermined minimum retardation of say 0.269g may be below a predetermined maximum value of say 110 lbs.

Upon failure of the circuit comprising the pressure space 2 and the pipeline 5, only the brakes on the front wheels 9 and 10 of the vehicle are applied from the pressure spaces 4 and 3. However the predetermined maximum effort applied to the pedal is still at least sufficient to subject the vehicle to the predetermined minimum retardation.

Similarly, upon failure of either the circuit comprising the pressure space 3 and the pipeline 13, or the circuit comprising the pressure space 4 and the pipeline 14, the brakes on the front wheels 9 and 10 of the vehicle can still be applied from the other pressure space 4 or 3, simultaneously with the brakes on the rear wheels 7 and 8 of the vehicle which are applied from the pressure space 2. Under such conditions the predetermined maximum effort applied to the pedal 15 is still at least sufficient to subject the vehicle to the predetermined minimum value of retardation.

Thus our invention ensures that for a given maximum pedal effort, under all conditions, the vehicle is subjected at least to a given predetermined value of retardation. Similarly under no circumstances can only the brakes of three wheels of the vehicle be applied.

When the vehicle is of articulated construction comprising a towing vehicle and a trailer or semi-trailer, failure of the brakes on the rear wheels prevents the occurrence of "jack-knifing" since only the front wheel brakes are applied.

In a modification of the braking system described above, a load sensing valve 16 may be interposed within the pipeline 5 to regulate the fluid pressure applied to the brakes on the rear wheels of the vehicle in accordance with the loading on the vehicle. That is to say the load sensing valve is adapted to reduce the pressures applied to the brakes on the rear wheels of the vehicle in proportion to reductions in the loading on those wheels.

Figure 2:
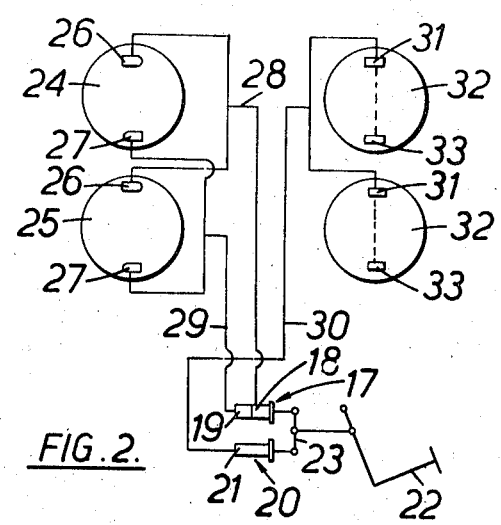
FIG. 2 is a layout of a braking system incorporating a tandem master cylinder and a single master cylinder.

In the braking system illustrated in the layout of FIG. 2 a tandem master cylinder 17 is provided with a first pressure space 18 and a second pressure space 19 defined in a cylinder bore between a positively actuated main piston and a floating piston, and between the floating piston and the closed end of the bore, respectively. A master cylinder 20 is provided with a third pressure space 21 defined in a cylinder bore between a positively actuated main piston and the closed end of the bore. The master cylinders 17 and 20 are adapted to be operated simultaneously from a common pedal 22 which acts on the actuating rods of the master cylinders through a balance beam 23.

Each front wheel 24 and 25 is adapted to be braked by an internal shoe-drum brake adapted to be actuated by one or both of a pair of independently operable wheel cylinders 26, and 27. Both wheel cylinders 26 are connected through a pipeline 28 to the pressure space 18, and both wheel cylinders 27 are connected through a pipeline 29 to the pressure space 19.

The pressure space 21 is connected through a pipeline 30 to a pair of wheel cylinders 31 for actuating simultaneously shoe-drum brakes on a pair of rear wheels 32.

In a modification the brakes on the rear wheels may also be actuated by further wheel cylinders 33 in series with the cylinders 31.

When the pedal 22 is operated, fluid under pressure is supplied through the pipelines 28, 29 and 30 to all the wheel cylinders so that all the brakes are applied simultaneously.

Upon failure of the circuit comprising the pressure space 21 and the pipeline 30, only the front wheel brakes will be applied.

Upon failure of either of the other circuits, the front wheel brakes can still be applied, but only by actuation of one wheel cylinder of each brake.

Figure 3:
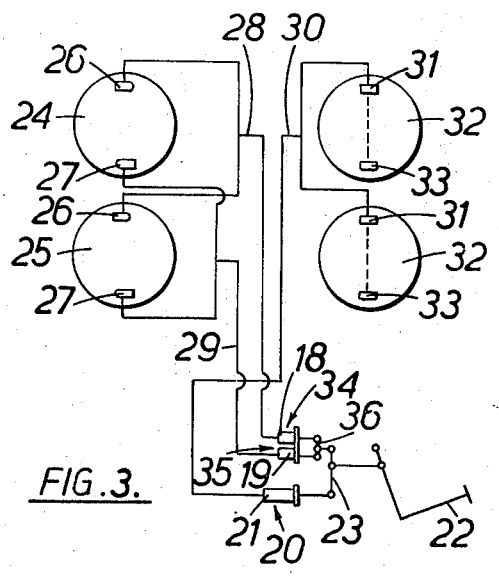
FIG. 3 is a layout similar to FIG. 2 but with the tandem master cylinder replaced by two single master cylinders.

In the system illustrated in FIG. 3 of the drawings, the tandem master cylinder 1 is replaced by two separate master cylinders 34 and 35, each defining within its cylinder bore one of the pressure spaces 18 and 19 respectively.

The three master cylinders 34, 35 and 20 are actuated by the pedal 22 which acts on the actuating rods through the balance beam 23 coupled to the actuating rod of the master cylinder 20, and all acts at its opposite end on an intermediate balance beam 36 which connects the actuating rods of the master cylinders 34 and 35.

The construction and operation of the system illustrated in FIG. 3 is otherwise the same as that of FIG. 2 and corresponding reference numerals have been applied to corresponding parts.

Figure 4:
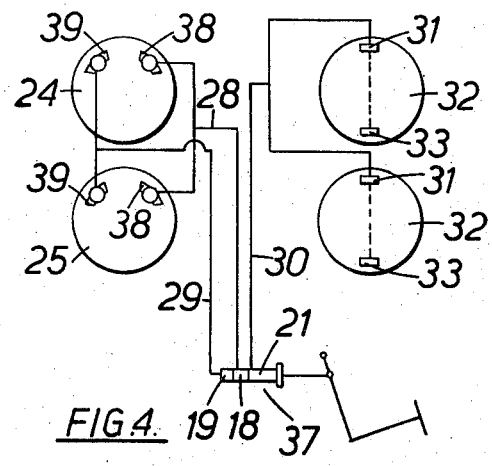
FIG. 4 is a layout similar to FIGS. 2 and 3 but incorporating a triple master cylinder and disc brakes on the front wheels of the vehicle.

In the system illustrated in FIG. 4 the three pressure spaces 21, 18 and 19 are defined within the bore of a triple master cylinder 37 between a positively actuated main piston and a first floating piston, between adjacent ends of the first floating piston and a second floating piston, and between the opposite end of the second floating piston and a closed end of the cylinder bore.

The front wheels 24 and 25 are each adapted to be braked by a pair of hydraulically actuated disc brakes 38 and 39 of which the hydraulic actuators of the disc brakes 38 are both connected to the pressure space 18, and the hydraulic actuators of the disc brakes 39 are both connected to the pressure space 19.

Upon failure of a circuit including either the pressure space 18 or 19 and the pipeline which it supplies, the disc brakes supplied by the other pressure space 19 or 18 will still be actuated to effect braking of the front wheels 24 and 25.

Figure 5:
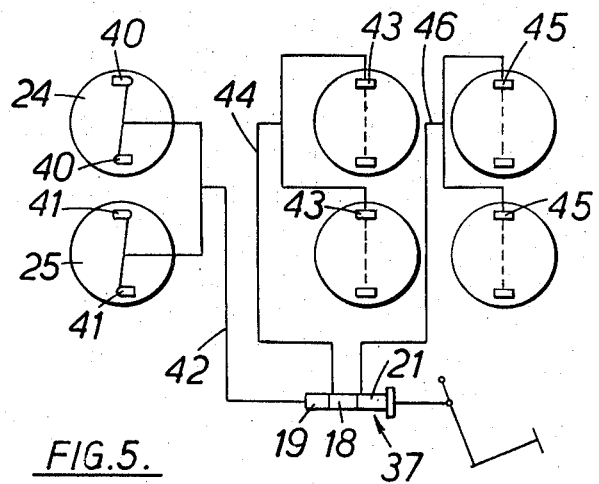
FIG. 5 is a modification of the system shown in FIG. 1.

In the system illustrated in FIG. 5, which is applied to a vehicle having three axles, pairs of wheel cylinders 40 and 41 for operating the brakes on the front wheels 24 and 25 of the vehicle are all supplied with fluid under pressure from the pressure space 19 through a pipeline 42.

Wheel cylinders 43 for operating brakes on one pair of rear wheels are supplied with fluid under pressure from the pressure space 18 through a pipeline 44, and wheel cylinders 45 for operating brakes on another pair of rear wheels are supplied with fluid under pressure from the pressure space 21 through a pipeline 46.

Failure of a circuit comprising a pressure space and a pipeline will cause failure of the brakes on one pair of wheels. However braking of the other two pairs of wheels can still take place when the master cylinder is operated.

In all the embodiments described above the master cylinders or master cylinder assemblies are actuated by the operation of a pedal acting directly on the actuating rods.

In a modification each master cylinder or master cylinder assembly may be actuated from an air booster under the control of a cab mounted treadle-type foot control valve.

The systems in accordance with our invention have the advantage that they can be constructed from standard components which require no modification.

Conveniently the shoe-drum brakes in the front wheels 24 and 25 of the embodiments of FIGS. 2 and 3 are provided with adjusters which are operated automatically to advance the shoes towards the drum to compensate for wear of the friction linings. This ensures that the shoes are movable only through a minimum distance in the application of those brakes. Thus for effective braking only a minimum applying force is required, and that force is readily available by the application of hydraulic pressure from one pressure space 18 or 19 to one actuator 26 or 27 of each brake.

Alternatively, the automatic adjusters may be omitted and signalling devices associated with the actuating rods of the master cylinders are provided to indicate the availability in one pressure space 18 or 19 of a sufficient volume of hydraulic fluid to apply the brakes on the front wheels 24 and 25 upon failure of a circuit containing one of the pressure spaces 18 or 19.

Our invention is also applicable to tractor/trailer or tractor/semi-trailer vehicles, in which a hydraulic master cylinder or master cylinders are operated from a pedal controlling the supply of air under pressure to a booster. In such an arrangement the brakes referred to in the embodiments described above as being located in the "front wheels" are provided on the tractor, and the other brakes are provided on the wheels of the trailer or semi-trailer.

The system described above preferably incorporates a load distributing valve which distributes the effective braking effort between the brakes on the front and rear wheels of a vehicle, or sets of brakes on those vehicles, in accordance with the loading on the vehicle to ensure that the braking effort applied to those wheels, or sets of wheels, is shared therebetween in a correct ratio. Ideally, with a fully laden vehicle, 64 percent of the braking effort is applied by the brakes on the front wheels of the vehicle, and 36 percent by the brakes on the rear wheels of the vehicle.

In order to achieve an emergency stop of the magnitude of 0.3g when the vehicle is fully laden, the load distributing valve is set to operate just before a deceleration of 0.6g is achieved.

In such an arrangement a very high pedal effort is required to achieve a deceleration of 0.3g for emergency stop conditions. However, in the embodiments described above when only one of a pair of actuators of each front wheel brake fails, that pedal effort is reduced to substantially one half of the valve normally required since, under such conditions, 32 percent of the braking effort is still applied by the front wheel brakes and 36 percent is applied by the rear wheel brakes. That reduced pedal effort can be attained without difficulty.

I claim:

1. An hydraulic braking system for a vehicle comprising first hydraulic actuators for applying brakes on each of one pair of wheels on opposite sides of the vehicle, second hydraulic actuators for applying brakes on each of a second pair of wheels on opposite sides of the vehicle, third hydraulic actuators for applying brakes on each of a third pair of wheels on opposite sides of the vehicle, a master cylinder assembly in which are defined first, second and third independent pressure spaces, a first connection between said first pressure space and said first hydraulic actuators, a second connection between said second pressure space and said second hydraulic actuators, and a third connection between said third pressure space and said third hydraulic actuators whereby in the event of the failure of one of said pressure spaces the remaining pressure spaces are operable to provide a balanced braking effort.

2. An hydraulic braking system as claimed in claim 1, wherein said first hydraulic actuators are adapted to actuate brakes one a pair of front wheels of the vehicle, said second hydraulic actuators are adapted to actuate brakes on one pair of rear wheels of the vehicle, and said third hydraulic actuators are adapted to actuate brakes on a second pair of rear wheels of the vehicle.

3. An hydraulic braking system for a vehicle comprising three pairs of brake actuators, one of each pair being respectively on one of a pair of corresponding wheels on opposite sides of the vehicle, each actuator being adapted to apply one of a pair of correspondingly located brakes, a first, a second, and a third master cylinder in which are defined first, second and third independent pressure spaces, and a separate connection between each of said pressure spaces and both actuators of each pair, said actuators and said connections being so constructed and arranged that, in the event of a failure of one of said pressure spaces, the remaining pressure spaces are operable to provide a balanced braking effort.

4. An hydraulic braking system as claimed in claim 3, incorporating a separate actuating rod for operating each of said master cylinder, and a single common pedal for actuating said rods simultaneously.

5. An hydrauic braking system as claimed in claim 4, incorporating at least one balance bar through which said pedal acts on said rods.

6. An hydraulic braking system for a vehicle comprising three pairs of brake actuators, one of each pair being respectively on one of a pair of corresponding wheels on opposite sides of the vehicle, each actuator being adapted to apply one of a pair of correspondingly locate brakes, a first master cylinder in which are defined first and second independent pressure spaces, a second master cylinder in which is defined a third pressure space and a separate connection between each of said pressure spaces and both actuators of each pair, said actuators and said connections being so constructed and arranged that, in the event of a failure of one of said pressure spaces, the remaining pressure spaces are operable to provide a balanced braking effort.

7. An hydraulic braking system as claimed in claim 6, incorporating a separate actuating rod for operating each said master cylinder, and a single common pedal for actuating said rods simultaneously.

8. An hydraulic braking system as claimed in claim 7, incorporating a common balance bar through which said pedal acts on said rods.

* * * * *